(12) United States Patent
Trahan et al.

(10) Patent No.: US 8,172,651 B1
(45) Date of Patent: May 8, 2012

(54) FISH SCALING TOOL

(75) Inventors: Mark James Trahan, Chauvin, LA (US); James Milton Kessler, New Orleans, LA (US)

(73) Assignee: Proscaler, LLC, New Orleans, LA (US)

( * ) Notice: Subject to any disclaimer, the term of this patent is extended or adjusted under 35 U.S.C. 154(b) by 0 days.

(21) Appl. No.: 13/188,294

(22) Filed: Jul. 21, 2011

Related U.S. Application Data

(60) Provisional application No. 61/366,808, filed on Jul. 22, 2010.

(51) Int. Cl.
*A22C 25/02* (2006.01)
(52) U.S. Cl. .................................................... 452/105
(58) Field of Classification Search .................. 119/600, 119/625, 630–632
See application file for complete search history.

(56) References Cited

U.S. PATENT DOCUMENTS

| | | | | |
|---|---|---|---|---|
| 191,608 | A * | 6/1877 | Miller | 119/617 |
| 223,775 | A * | 1/1880 | Sweet | 119/631 |
| 397,926 | A * | 2/1889 | McPherson | 119/613 |
| 436,744 | A * | 9/1890 | Schofield | 119/631 |
| 441,472 | A * | 11/1890 | Du Shane | 119/631 |
| 1,000,073 | A | 8/1911 | Clarke | |
| 1,172,688 | A * | 2/1916 | Edgar | 119/631 |
| 2,516,414 | A | 7/1950 | Pilliod | |
| 2,531,064 | A | 11/1950 | Lindsey | |
| D205,884 | S | 10/1966 | Canion | |

* cited by examiner

*Primary Examiner* — Richard Price, Jr.
(74) *Attorney, Agent, or Firm* — J. Charles Dougherty

(57) ABSTRACT

A fish scaling tool comprises a handle with an angled head formed of two forked tines. A pair of blade assemblies are attached to the tines and extend downwardly from the head. The blade assemblies each have two rows of serrated, triangular-shaped teeth. On each blade assembly, the rows of teeth are angled outwardly with respect to each other. The handle features a contoured cover with recesses to provide a sure grip for the user. The tool provides an easy, reliable means to scale any fish, particularly those fish that are generally difficult to scale, such as the larger saltwater gamefish.

20 Claims, 1 Drawing Sheet

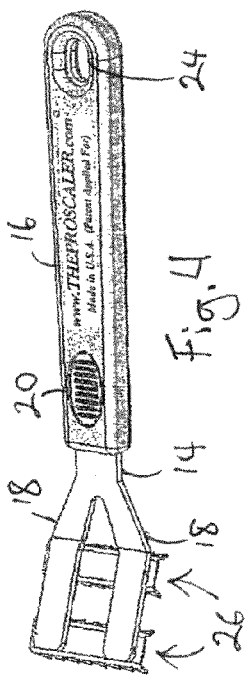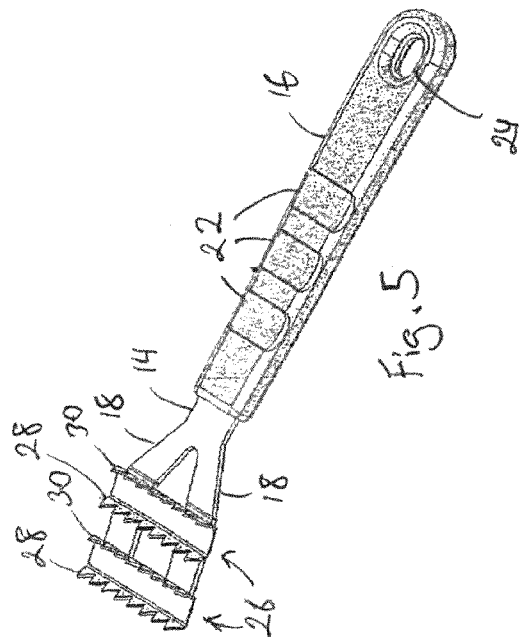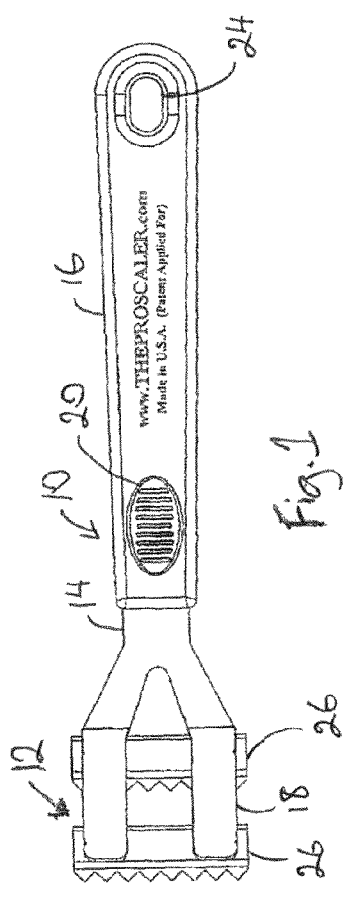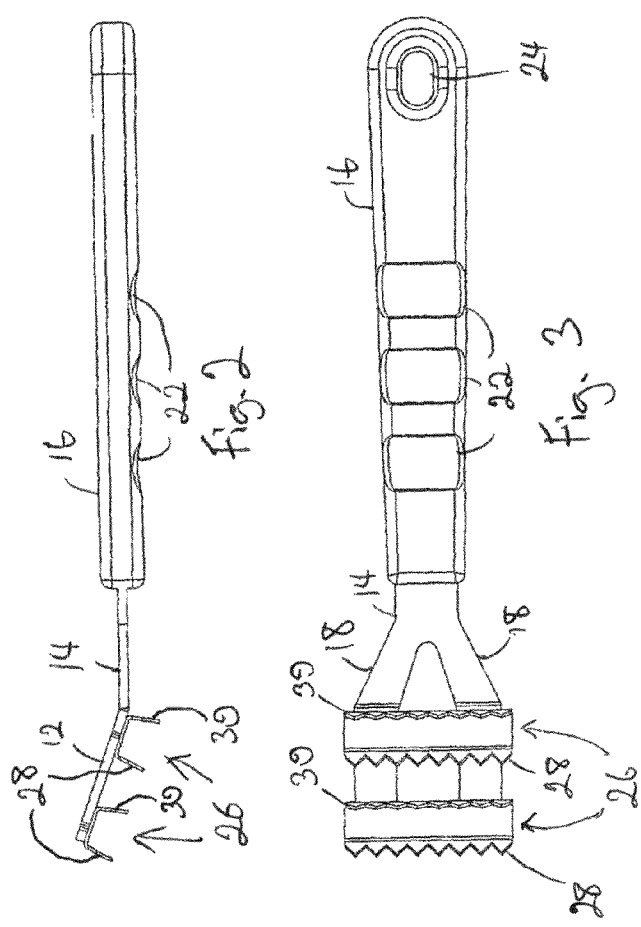

FISH SCALING TOOL

CROSS-REFERENCE TO RELATED APPLICATIONS

This application claims the benefit of provisional patent application no. 61/366,808, entitled "Fish Scaling Tool" and filed on Jul. 22, 2010. Such application is incorporated herein by reference in its entirety.

STATEMENT REGARDING FEDERALLY SPONSORED RESEARCH OR DEVELOPMENT

Not applicable.

BACKGROUND OF THE INVENTION

The invention is directed to a device for scaling fish, and in particular is directed to such a device that is especially adapted for hand use by sport fishermen.

Various devices intended to remove the scales from fish are known in the art. There are many powered fish-scaling devices, many involving a rotary tool that removes fish scales by abrasion of a roughened surface with the skin of the fish. Such devices are often costly and are dependent upon the availability of a power source, and are thus not ideal for most sport fishermen. In addition, many hand-operated fish scaling tools are known. Some involve a toothed blade that is drawn over the body of the fish from head to tail (that is, in the opposite direction to which the scales naturally grow) in order to remove the scales by engaging the ends of the scales that extend rearwardly from the skin of the fish. The inventor has found that existing devices are relatively poor at removing scales from certain fish, including for example the larger saltwater gamefish, such as the red drum, black drum, and red snapper. Many passes may be required, and even after significant work the result may be a fish that is not cleanly scaled. In addition, existing devices tend to be fragile or not sufficiently durable to withstand harsh, saltwater conditions for extended periods. It would be desirable to develop an improved hand-operated fish scaling tool that has improved durability, and also minimizes the effort required of the fisherman in order to scale a fish, resulting in a cleanly scaled fish that is ready for further preparation, cooking, and consumption.

References mentioned in this background section are not admitted to be prior art with respect to the present invention.

BRIEF SUMMARY OF THE INVENTION

The present invention is directed to an improved hand-operated fish scaling tool that provides for a simple, clean scaling operation by a fisherman.

In a first aspect, the present invention is directed to a fish scaling tool comprising a handle and a first blade assembly attached to the handle, wherein the first blade assembly is disposed perpendicularly to a longitudinal axis of the handle, wherein the first blade assembly comprises first and second rows of teeth extending downwardly from the handle, and wherein the first row of teeth is disposed at an angle with respect to the second row of teeth.

In a second aspect, the present invention is directed to a fish scaling tool, comprising a handle comprising a shank, a head attached to the shank at an acute angle, and a contoured cover attached to the shank to provide an area for a user to grip the tool; and first and second blade assemblies attached to the head of the handle, wherein the first and second blade assemblies are disposed parallel to each other, the first and second blade assemblies are disposed perpendicularly to a longitudinal axis of the handle, each of the first and second blade assemblies comprises first and second rows of teeth extending downwardly from the handle, and the first row of teeth of each of the first and second blade assemblies are disposed at an angle with respect to the second row of teeth of each of the first and second blade assemblies.

These and other features, objects and advantages of the present invention will become better understood from a consideration of the following detailed description of the preferred embodiments and appended claims in conjunction with the drawings as described following:

BRIEF DESCRIPTION OF THE SEVERAL VIEWS OF THE DRAWINGS

FIG. 1 is a top plan view of a preferred embodiment of the present invention.

FIG. 2 is a side elevational view of a preferred embodiment of the present invention.

FIG. 3 is a bottom plan view of a preferred embodiment of the present invention.

FIG. 4 is a top perspective view of a preferred embodiment of the present invention.

FIG. 5 is a bottom perspective view of a preferred embodiment of the present invention.

DETAILED DESCRIPTION OF THE PREFERRED EMBODIMENT(S)

With reference to FIGS. 1-5, the preferred embodiment of the present invention may be described. Handle 10 of the device is formed of a preferably integrated head 12 and shank 14. Handle 10 is preferably formed of 316 stainless steel for durability and corrosion resistance, although other materials may be substituted in alternative embodiments. Head 12 is formed in a forked shape, with two tines 18 extending toward the distal end of the device. Tines 18 of head 12 are preferably angled upward with respect to the plane of shank 14. In the preferred embodiment, the angle formed between tines 18 and the plane of shank 14 is between 10 and 30 degrees, and the ideal angle is believed to be 19 degrees. The inventor believes this angle is important to the improved functionality of the device because it naturally directs the user to hold the device in such a manner as to provide the smoothest and easiest scaling of fish. This is particularly important when the device is used with respect to those fish that are generally considered difficult to scale, and also minimizes the effort required for scaling of all fish.

Molded or fitted onto shank 14 is handle cover 16. Handle cover 16 is preferably formed of a nylon-injected plastic for user comfort and durability, although many other materials as known in the art could be substituted in alternative embodiments. Cover 16 has three half-oval-shaped lower recesses 22, and one oval-shaped upper recess 20 with serrations; these recesses provide an improved grip for the user of the device, and naturally direct the user's hand to the most appropriate and comfortable holding position for use of the device. Hole 24 through shank 14 and cover 16 provides a convenient means of hanging the device for ease of access when not in use, or for the attachment of a lanyard or the like. Hole 24 may be omitted in alternative embodiments.

Welded or otherwise attached across tines 18 of head 12 of handle 10 are two blade assemblies 26. One blade assembly 26 or more than two blade assemblies 26 could be substituted in alternative embodiments, although the inventor believes that the ideal arrangement is two blade assemblies 26 as shown in FIGS. 1-5. Blade assemblies 26 are attached such that they are aligned perpendicularly to the longitudinal axis of handle 10, and thus the proper orientation of the device in use is for the longitudinal axis of handle 10 to be parallel to the orientation of the fish to be scaled. This may be contrasted with many of the prior art hand-operated scaling devices, which are constructed in such a manner that the handle extends perpendicularly to the orientation of the fish during scaling. The orientation of the preferred embodiment gives the user much greater leverage, which is particularly important with respect to those fish that are larger or more difficult to scale.

Each blade assembly 26 is preferably formed as a generally U-shaped channel formed of stainless steel. At the lower edges of blade assembly 26, teeth are cut out to form first row of teeth 28 and second row of teeth 30. First row 28 is positioned toward the distal end of tines 18, away from the user during use, while second row 30 is generally positioned toward the rear of the device; in the preferred embodiment, however, first row 28 and second row 30 are formed in the same manner. Each of first row 28 and second row 30 comprise a plurality of triangular-shaped teeth that operate to engage the scales of a fish during use, such that pulling of the device lengthwise causes the scales to be removed. The apex angle of each of the teeth on first row 28 and second row 30 preferably is between 30 and 45 degrees, and ideally 37 degrees. The inventor has found that this angle provides the most efficient scaling operation with the device.

It may be seen, with particular reference to FIGS. 2 and 3, that first row 28 and second row 30 of each blade assembly 26 are preferably formed such that they extend slightly outwardly at an angle that is not a right angle with the plane of tines 18 of head 12. They preferably extend such that first row 28 and second row 30 tend to point outwardly from each other on each blade assembly 26. Preferably, the angle that first row 28 makes with tines 18 (as measured extending outwardly toward the distal end of tines 18) is between 45 and 90 degrees, and ideally the angle is 72 degrees. Likewise, the corresponding angle for second row 30 is between 90 and 135 degrees, and ideally the angle is 108 degrees. The inventor has found that these angles provide the most efficient scaling, in particular with respect to those gamefish with larger scales that are more difficult to remove.

In order to operate the device, the user simply holds the tool in one hand, and pulls the teeth of blade assemblies 26 across the fish to be scaled from tail to head, applying a downward pressure. The appropriate amount of pressure may be varied by the user, based on experience, according to the particular species of fish being scaled. The result will be a simple, quick, and efficient scaling operation, usually requiring only three or four passes of the tool on each side of the fish in order to remove all of the scales.

As used herein, "comprising" is synonymous with "including," "containing," or "characterized by," and is inclusive or open-ended and does not exclude additional, unrecited elements or method steps. As used herein, "consisting of" excludes any element, step, or ingredients not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Thus, additional embodiments are within the scope of the invention and within the following claims.

In general the terms and phrases used herein have their art-recognized meaning, which can be found by reference to standard texts, journal references and contexts known to those skilled in the art. The preceding definitions are provided to clarify their specific use in the context of the invention.

The present invention has been described with reference to certain preferred and alternative embodiments that are intended to be exemplary only and not limiting to the full scope of the present invention as set forth in the appended claims.

The invention claimed is:

1. A fish scaling tool, comprising:
   a. a handle comprising a distal end; and
   b. a first blade assembly attached to the handle, wherein the first blade assembly is disposed perpendicularly to a longitudinal axis of the handle, wherein the first blade assembly comprises first and second rows of teeth extending downwardly from the handle; the first row of teeth is nearer to the distal end of the handle than the second row of teeth and is disposed at an acute angle with respect to the distal end of the handle; and the second row of teeth is disposed at an obtuse angle with respect to the distal end of the handle.

2. The fish scaling tool of claim 1, wherein the first row of teeth is disposed at an angle of between 45 degrees and 90 degrees with respect to the distal end of the handle, and the second row of teeth is disposed at an angle of between 90 degrees and 135 degrees with respect to the distal end of the handle.

3. The fish scaling tool of claim 2, wherein the first row of teeth is disposed at an angle of 72 degrees with respect to the distal end of the handle, and the second row of teeth is disposed at an angle of 108 degrees with respect to the distal end of the handle.

4. The fish scaling tool of claim 1, further comprising a second blade assembly disposed perpendicularly to a longitudinal axis of the handle, wherein the second blade assembly is positioned parallel to the first blade assembly.

5. The fish scaling tool of claim 4, wherein the second blade assembly comprises third and fourth rows of teeth extending downwardly from the handle, and wherein the third row of teeth is disposed at an angle with respect to the fourth row of teeth.

6. The fish scaling tool of claim 5, wherein the third row of teeth is nearer to the distal end of the handle than the fourth row of teeth, the third row of teeth is disposed at an acute angle with respect to the distal end of the handle, and the fourth row of teeth is disposed at an obtuse angle with respect to the distal end of the handle.

7. The fish scaling tool of claim 6, wherein the third row of teeth is disposed at an angle of between 45 degrees and 90 degrees with respect to the distal end of the handle, and the fourth row of teeth is disposed at an angle of between 90 degrees and 135 degrees with respect to the distal end of the handle.

8. The fish scaling tool of claim 7, wherein the third row of teeth is disposed at an angle of 72 degrees with respect to the distal end of the handle, and the fourth row of teeth is disposed at an angle of 108 degrees with respect to the distal end of the handle.

9. The fish scaling tool of claim 1, wherein the first and second rows of teeth each comprise a plurality of triangular-shaped teeth.

10. The fish scaling tool of claim 9, wherein each of the plurality of triangular-shaped teeth comprises an apex angle of between 30 and 45 degrees.

11. The fish scaling tool of claim 10, wherein each of the plurality of triangular-shaped teeth comprises an apex angle of about 37 degrees.

12. The fish scaling tool of claim 1, wherein the handle comprises a shank and a head, wherein the blade assembly is connected to the head, and wherein the head is connected to the shank at an angle.

13. The fish scaling tool of claim 12, wherein the handle is connected to the shank at an angle of between 10 degrees and 30 degrees.

14. The fish scaling tool of claim 13, wherein the handle is connected to the shank at an angle of 19 degrees.

15. The fish scaling tool of claim 1, wherein the head comprises a pair of forked tines extending from the shank.

16. The fish scaling tool of claim 15, wherein the handle comprises a contoured cover comprising at least one serrated recess.

17. A fish scaling tool, comprising:
a. a handle comprising a shank, a head attached to the shank at an acute angle, and a contoured cover attached to the shank to provide an area for a user to grip the tool; and
b. first and second blade assemblies attached to the head of the handle, wherein the first and second blade assemblies are disposed parallel to each other, the first and second blade assemblies are disposed perpendicularly to a longitudinal axis of the handle, each of the first and second blade assemblies comprises first and second rows of teeth extending downwardly from the handle, wherein the first row of teeth of each of the first and second blade assemblies is disposed at an angle of between 45 degrees and 90 degrees with respect to the head of the handle, and the second row of teeth of each of the first and second blade assemblies is disposed at an angle of between 90 degrees and 135 degrees with respect to the head of the handle.

18. The fish scaling tool of claim 17, wherein the handle is connected to the shank at an angle of between 10 degrees and 30 degrees.

19. The fish scaling tool of claim 18, wherein the handle is connected to the shank at an angle of 19 degrees.

20. The fish scaling tool of claim 17, wherein the head comprises a pair of forked tines extending from the shank.

* * * * *